United States Patent
Haynes et al.

(10) Patent No.: US 7,832,685 B2
(45) Date of Patent: Nov. 16, 2010

(54) STOWAGE BIN WITH SHEAR FITTINGS

(75) Inventors: Michael S. Haynes, Seattle, WA (US);
Chad D. Schmitz, Arlington, WA (US);
Joseph M. Manhardt, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/545,957

(22) Filed: Aug. 24, 2009

(65) Prior Publication Data
US 2009/0321566 A1  Dec. 31, 2009

Related U.S. Application Data

(63) Continuation of application No. 11/250,689, filed on Oct. 14, 2005, now abandoned.

(51) Int. Cl.
*B64D 9/00* (2006.01)
(52) U.S. Cl. .............. 244/118.1; 244/129.4; 296/37.8; 312/248
(58) Field of Classification Search ........... 244/118.1, 244/118.2, 129.4, 137.1, 129.1; 296/37.7, 296/37.8; 312/246, 248
See application file for complete search history.

(56) References Cited

U.S. PATENT DOCUMENTS

| | | | |
|---|---|---|---|
| 4,275,942 A | 6/1981 | Steidl | |
| 4,368,937 A | 1/1983 | Palombo et al. | |
| 5,108,048 A | 4/1992 | Chang | |
| 5,244,269 A | 9/1993 | Harriehausen et al. | |
| 5,383,628 A * | 1/1995 | Harriehausen et al. ... | 244/118.1 |
| 5,456,529 A | 10/1995 | Cheung | |
| 5,567,028 A | 10/1996 | Lutovsky et al. | |
| 5,716,027 A | 2/1998 | Hart et al. | |
| 5,839,694 A | 11/1998 | Bargull et al. | |
| 5,842,668 A | 12/1998 | Spencer | |
| 5,868,353 A | 2/1999 | Benard | |
| 5,934,615 A | 8/1999 | Treichler et al. | |
| 6,007,024 A | 12/1999 | Stephan | |
| 6,045,204 A | 4/2000 | Frazier et al. | |
| 6,062,509 A | 5/2000 | Burrows et al. | |
| 6,318,671 B1 * | 11/2001 | Schumacher et al. ..... | 244/118.5 |
| 6,398,163 B1 | 6/2002 | Welch et al. | |
| 6,484,969 B2 | 11/2002 | Sprenger et al. | |
| 6,691,951 B2 | 2/2004 | Frazier | |
| 6,769,831 B2 | 8/2004 | Aquino et al. | |
| 6,883,753 B1 | 4/2005 | Scown | |
| 7,097,138 B2 | 8/2006 | Stephan et al. | |
| 7,128,295 B2 | 10/2006 | Scown | |
| 7,143,977 B2 | 12/2006 | Graf et al. | |
| 7,258,406 B2 | 8/2007 | Stephan et al. | |
| 2003/0080247 A1 | 5/2003 | Frazier | |

(Continued)

*Primary Examiner*—Benjamin P Lee
(74) *Attorney, Agent, or Firm*—Yee & Associates, P.C.; Charles S. Gumpel

(57) ABSTRACT

An aircraft stowage bin assembly includes shear fittings configured to route a content load from the bucket of the bin assembly to the airframe in the event of a forward load condition, such as a crash or severe turbulence. When the forward inertial load factor on the stowage bin is greater than about 1 g, the shear fittings create an efficient load path from the bucket to the airframe which bypasses the large metallic or composite endframes required by the designs of many conventional overhead stowage bins. As a result, significant reductions in overall bulk and weight, as well as lower manufacturing costs, can be realized.

18 Claims, 5 Drawing Sheets

U.S. PATENT DOCUMENTS

| | | |
|---|---|---|
| 2005/0218264 A1 | 10/2005 | Graf et al. |
| 2005/0224643 A1 | 10/2005 | Graf et al. |
| 2006/0151668 A1 | 7/2006 | Scown |
| 2008/0078868 A1 | 4/2008 | Lamoree et al. |
| 2008/0277527 A1* | 11/2008 | Fokken et al. ............ 244/118.1 |

* cited by examiner

STOWAGE BIN WITH SHEAR FITTINGS

This application is a continuation of application Ser. No. 11/250,689, filed Oct. 14, 2005, now abandoned status pending.

BACKGROUND

This disclosure relates generally to stowage bins and, more particularly, to overhead stowage bins in vehicle passenger cabins.

Modern passenger airplanes often include overhead stowage bins in the passenger cabin for storage of carry-on luggage and other items. Such bins are often mounted with numerous mountings located along the ceiling and sidewalls of the passenger cabin. These mountings are typically designed to support a predetermined amount of weight within the bins during normal flight conditions. In addition, the mountings are designed to keep the bins securely fastened to the airframe in the event of a crash or severe turbulence.

For example, current FAA regulations require that each baggage compartment have a means to protect occupants from injury by the contents of the compartment when the ultimate forward inertial load factor exceeds 9 g. To satisfy this requirement, conventional overhead stowage bins are often designed to bear their content load into large endframes during a forward load condition, such as a crash. These large endframes, in turn, typically route the loads to connecting panels attached to the airframe.

Such conventional designs are usually effective for preventing bins from detaching from their mountings and falling completely or allowing items to fall on passengers' heads during a forward load condition, such as a crash. On the other hand, these conventional designs also present a number of drawbacks. For example, conventional overhead stowage bins are often bulky and somewhat heavy. In addition, conventional overhead stowage bins can be rather costly to manufacture and assemble. These drawbacks are becoming increasingly significant, as aircraft designers strive to develop more and more efficient aircraft designs.

BRIEF DESCRIPTION

The above-mentioned drawbacks associated with existing overhead stowage bins are addressed by embodiments of the present invention, which will be understood by reading and studying the following specification.

In one embodiment, a stowage bin assembly comprises an upper panel comprising one or more first shear fitting components, a lower panel comprising one or more first shear fitting components, and a bucket comprising one or more second shear fitting components. The bucket is configured to cooperate with the upper panel and the lower panel such that, when the bin assembly is in a closed position, the first shear fitting components engage with the second shear fitting components to create a plurality of shear fittings capable of withstanding a substantial shear force between the bucket and the panels of the bin assembly.

In another embodiment, an aircraft overhead stowage bin comprises at least one support panel mounted to an interior portion of an airframe and one or more side panels coupled to the at least one support panel. The aircraft overhead stowage bin further comprises a bucket coupled to the one or more side panels, the bucket configured to contain a selected weight load, as well as means for routing the weight load from the bucket directly to the at least one support panel mounted to the airframe under a forward load condition.

In another embodiment, an aircraft comprises an airframe and one or more stowage bin assemblies mounted to the airframe. Each stowage bin assembly is configured to contain a selected weight load. In addition, each stowage bin assembly comprises one or more shear fittings configured to transfer the weight load directly from the stowage bin assembly to the airframe under a forward load condition.

In another embodiment, a method of securing a stowage bin within an aircraft comprises providing at least one support panel coupled to an airframe and providing a bucket coupled to the at least one support panel and configured to contain a selected weight load. The method further comprises securing the bucket to the at least one support panel with one or more shear fittings which, in the event of a forward load condition, transfer the weight load directly from the bucket to the at least one support panel coupled to the airframe.

The details of one or more embodiments of the claimed invention are set forth in the accompanying drawings and the description below. The features, functions, and advantages can be achieved independently in various embodiments of the claimed invention, or may be combined in yet other embodiments.

DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Figure 1:
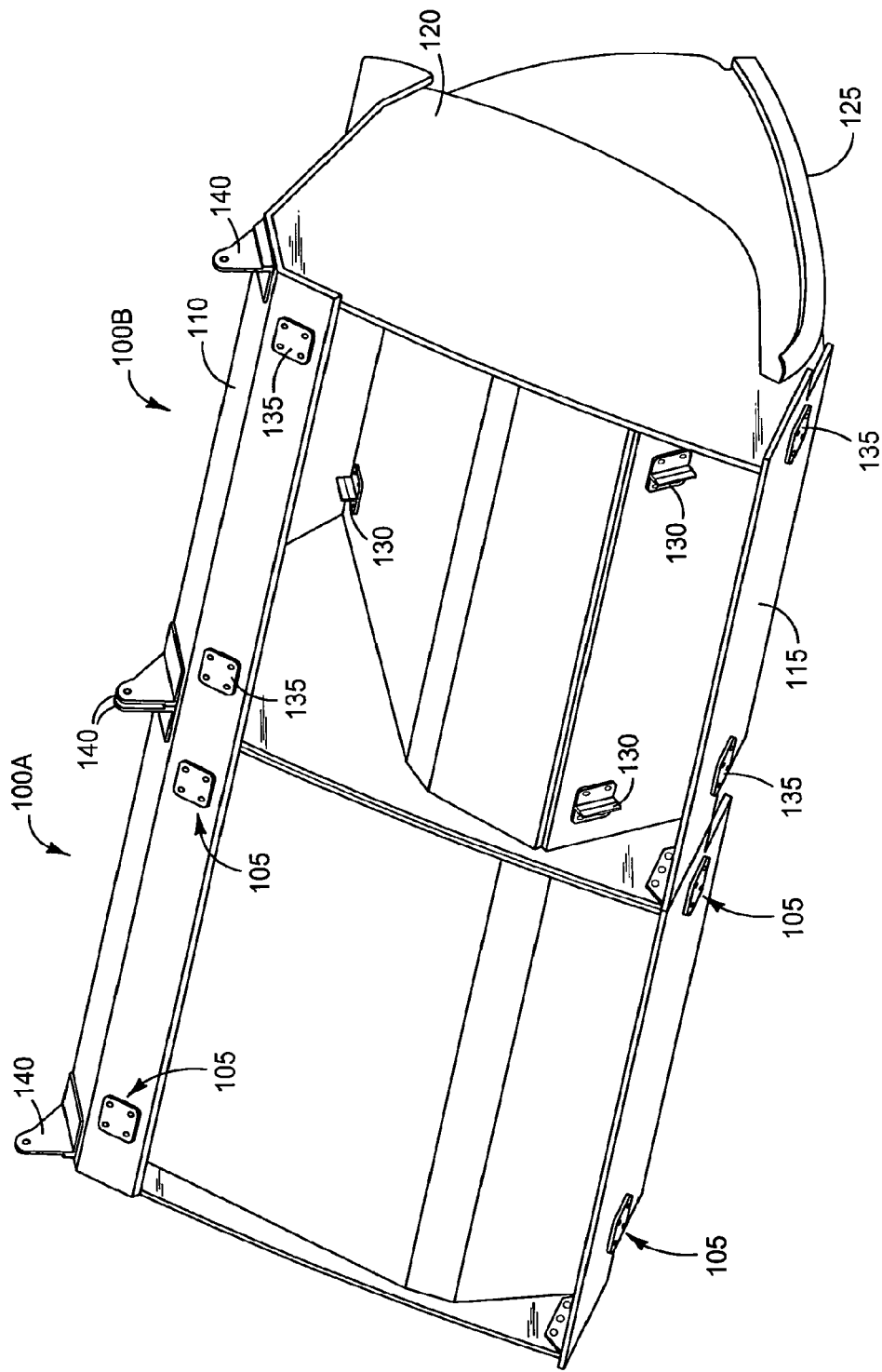
FIG. 1 is a perspective view of overhead stowage bin assemblies including shear fittings.
Figure 6:
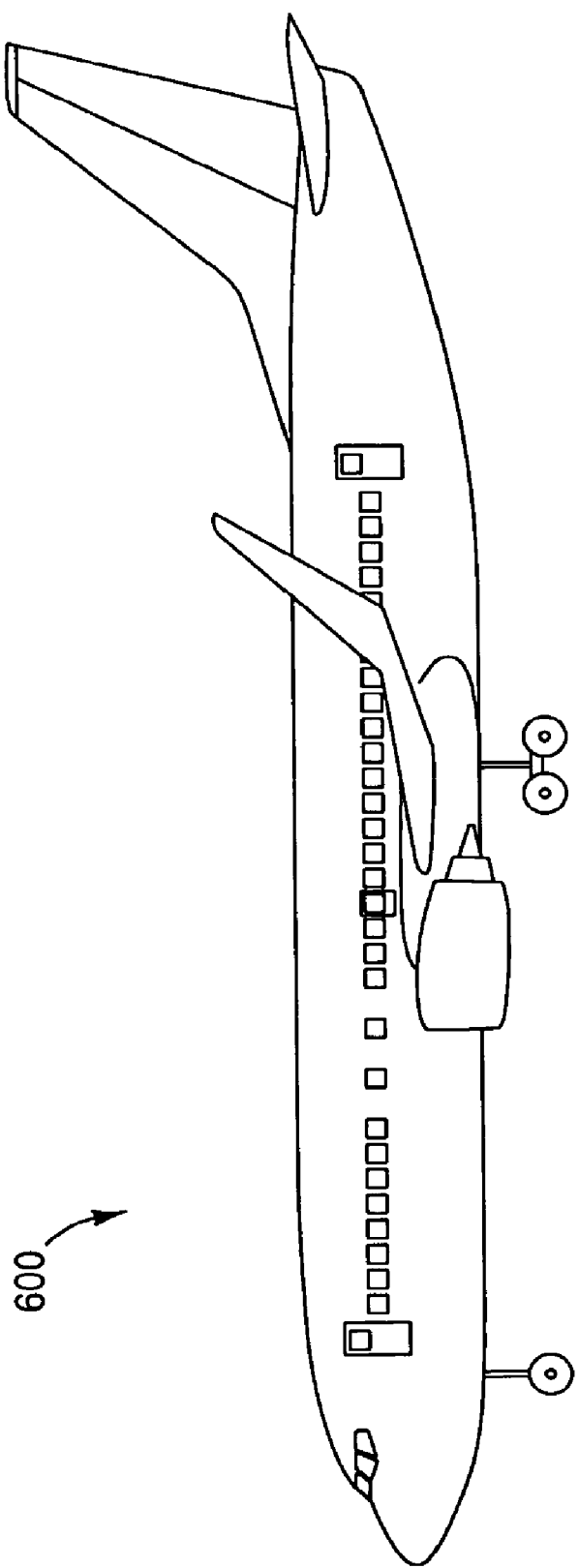
FIG. 6 is a schematic of an aircraft including overhead stowage bin assemblies with shear fittings.

FIG. 1 is a perspective view of one embodiment of overhead stowage bin assemblies, generally designated by reference number 100 including shear fittings, generally designated by reference number 105. For purposes of illustration in this disclosure, the bin assemblies 100 include first and second bin assemblies 100A and 100B, and are described primarily with reference to an aircraft, such as, for example, the aircraft 600 illustrated in FIG. 6. The bin assemblies 100 can also be used, however, in other passenger vehicles, such as buses, trains, ships, etc.

For illustrative purposes, a reverse view of the bin assemblies 100 is shown, i.e., a view from the perspective of one located behind the bin assemblies 100 rather than the perspective of a passenger. In addition, first bin assembly 100A is shown in a closed position, and second bin assembly 100B is shown in an open position.

In the illustrated embodiment, each bin assembly 100A, 100B comprises an upper panel 110, a lower panel 115, two side panels 120, and a bucket 125. Each shear fitting 105 comprises a male component 130 and a female component 135, which become engaged when the bucket 125 is closed, as described in more detail below.

If desired, the bin assemblies 100 can be designed to have a traditional appearance and to be operated by passengers and flight crew in the same way as a conventional overhead stowage bin. For example, the upper panel 110, lower panel 115, and side panels 120 can be fabricated from a variety of suitable materials, such as composites, plastics, etc., and can be mounted to the ceiling and sidewalls of an aircraft passenger cabin using a variety of conventional techniques that are well-known to those of ordinary skill in the art. Exemplary mounting hardware 140 is illustrated in FIG. 1.

Similarly, the bucket 125 can be fabricated from a variety of well-known materials and can be designed to cooperate with the upper panel 110, lower panel 115, and side panels 120 using conventional techniques. For example, in the illustrated embodiment, the bucket 125 includes a standard pivot mechanism near the back and a latch mechanism near the front (not shown) such that the bin assemblies 100 can be opened and closed by operating the latch and rotating the bucket about the pivot, in a manner that is familiar to many airline passengers and flight crew. In other embodiments, the bin assemblies 100 can be opened and closed with an articulating mechanism or any other suitable mechanism for opening and closing the bin assemblies 100.

Figure 2A:
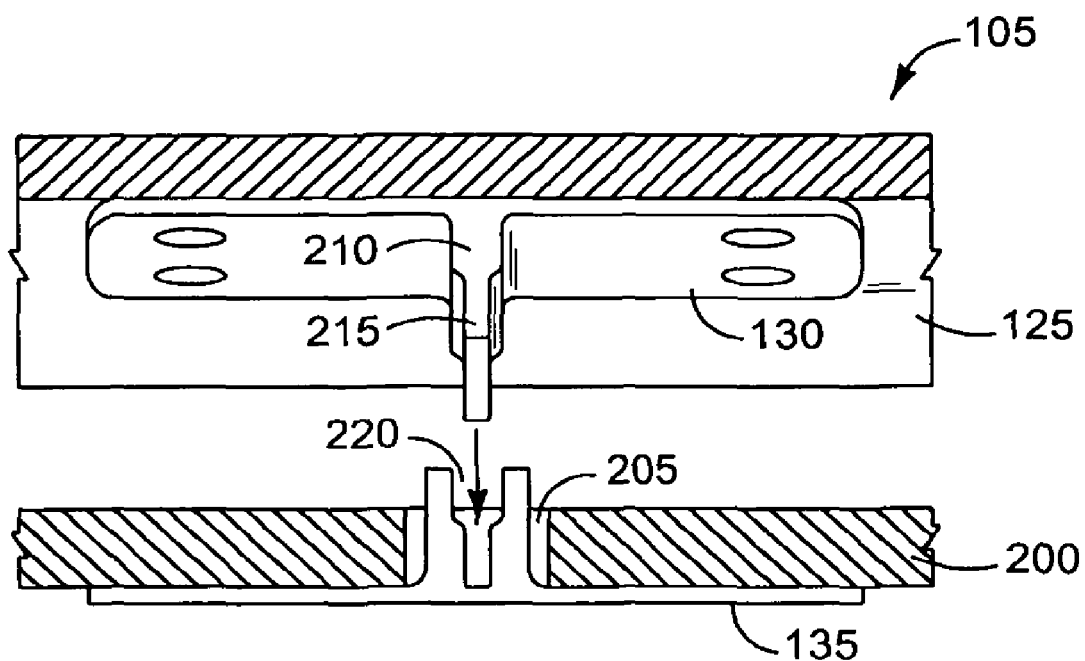
FIG. 2A is an end cross-sectional view of the shear fitting illustrated in FIG. 1 in an open position.
Figure 2B:
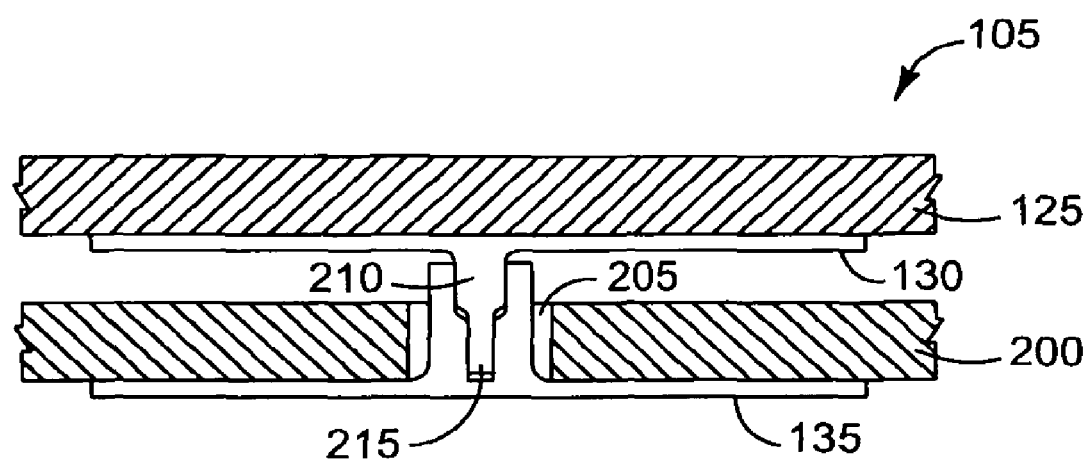
FIG. 2B is an end cross-sectional view of the shear fitting illustrated in FIG. 1 in a closed position.
Figure 3A:
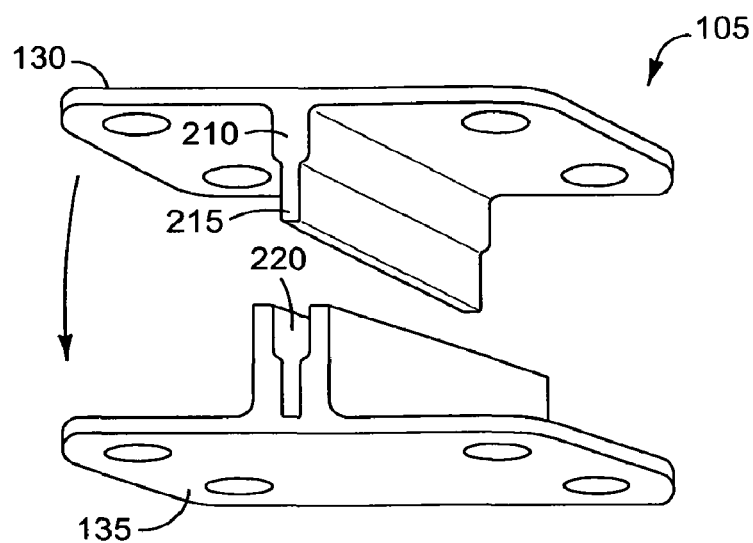
FIG. 3A is a perspective view of the shear fitting illustrated in FIG. 1 in an open position.
Figure 3B:
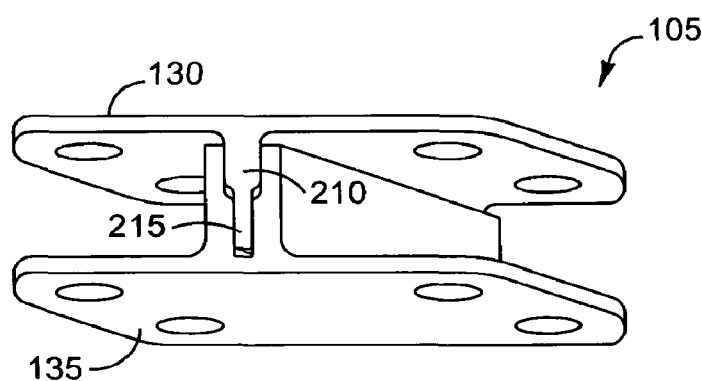
FIG. 3B is a perspective view of the shear fitting illustrated in FIG. 1 in a closed position.

FIGS. 2A and 2B and FIGS. 3A and 3B illustrate the embodiment of the shear fitting 105 shown in FIG. 1 in more detail. Specifically, FIG. 2A is an end cross-sectional view of the shear fitting 105 in an open position, and FIG. 2B is an end cross-sectional view of the shear fitting 105 in a closed position. FIG. 3A is a perspective view of the shear fitting 105 in an open position, and FIG. 3B is a perspective view of the shear fitting 105 in a closed position. For illustrative purposes, FIGS. 3A and 3B show the shear fitting 105 without the surrounding bin structures or support panels.

The shear fitting 105 comprises a male component 130 and a female component 135. In the illustrated embodiment, the male component 130 is attached to the bucket 125 of a bin assembly 100A, 100B, and the female component 135 is attached to a support panel 200 of a bin assembly 100A, 100B, such as the upper panel 110 or the lower panel 115. In other embodiments, the female component 135 may be attached to the bucket 125, and the male component 130 may be attached to the support panel 200. As shown in FIG. 1, a plurality of shear fittings 105 may be provided to attach each bucket to a support panel.

In some embodiments, the shear fitting 105 is designed such that the male component 130 engages with the female component 135 when the bin assemblies 100 are closed, as illustrated in FIGS. 2B and 3B. When so engaged, the shear fitting 105 is preferably designed to withstand a substantial shear force between the bucket 125 and the corresponding support panel 200 of the bin assemblies 100. Thus, when the bin assemblies 100 experience a forward load condition, such as a forward inertial load factor greater than about 1 g, the shear fitting 105 creates an efficient load path for the contents of the bin assemblies 100, as described in more detail below.

The male component 130 and the female component 135 of the shear fitting 105 may comprise any suitable material, such as, for example, metals (e.g., aluminum, steel, etc.), alloys, composites, etc. In addition, the male component 130 and the female component 135 of the shear fitting 105 can be attached to the corresponding structure of the bin assemblies 100 using any suitable method.

For example, in the illustrated embodiment, the male component 130 of the shear fitting 105 is surface mounted to the bucket 125 with a bonding adhesive and suitable fasteners, such as screws, rivets, etc. The female component 135 of the shear fitting 105 is embedded within the support panel 200 of the bin assemblies 100 by first creating a cavity 205 within the support panel 200. The female component 135 is then mounted to the back surface of the support panel 200 using a bonding adhesive and suitable fasteners, such as screws, rivets, etc. Many other suitable mounting configurations and techniques can be implemented for attaching the male component 130 and the female component 135 of the shear fitting 105 to the corresponding structure of the bin assemblies 100.

In some embodiments, the male component 130 and the female component 135 of the shear fitting 105 can be formed as integral parts of the bucket 125 and support panel(s) 200 of the bin assemblies 100 during the manufacturing process. For example, if the bucket 125 is manufactured using an injection molding process, the mold can be modified to include the male component 130 or female component 135 of the shear fitting 105, such that the appropriate component is formed as an integral part of the bucket 125 during manufacture.

In the illustrated embodiment, the male component 130 of the shear fitting 105 comprises a single extension having a thick portion 210 near the base and a thinner portion 215 near the tip. The female component 135 of the shear fitting 105 comprises a single groove 220 having a complementary cross-sectional profile to accommodate the male component 130. While this particular configuration presents certain structural advantages, numerous other suitable configurations are possible.

Figure 4:
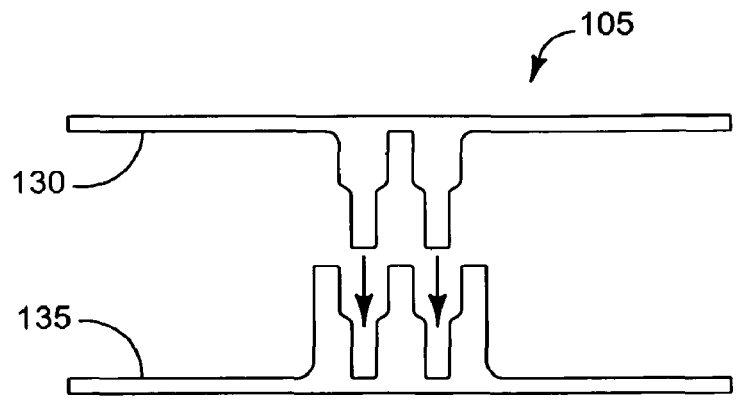
FIG. 4 illustrates one exemplary alternative embodiment of the shear fitting illustrated in FIG. 1.

For example, one alternative embodiment is illustrated in FIG. 4, in which the male component 130 of the shear fitting 105 comprises multiple extensions, and the female component 135 comprises a corresponding number of grooves. In other embodiments, the shear fitting 105 may comprise a mortise and tenon joint. As another example, the cross-sectional profile of the extension(s) and groove(s) may vary widely to optimize the performance of the shear fitting 105 in a given setting. For example, the male component 130 may comprise an angled or curved extension, if desired. Many other possible configurations of the shear fitting 105 will become apparent to those of ordinary skill in the art in view of the present disclosure, and are within the scope of this application.

Figure 5A:
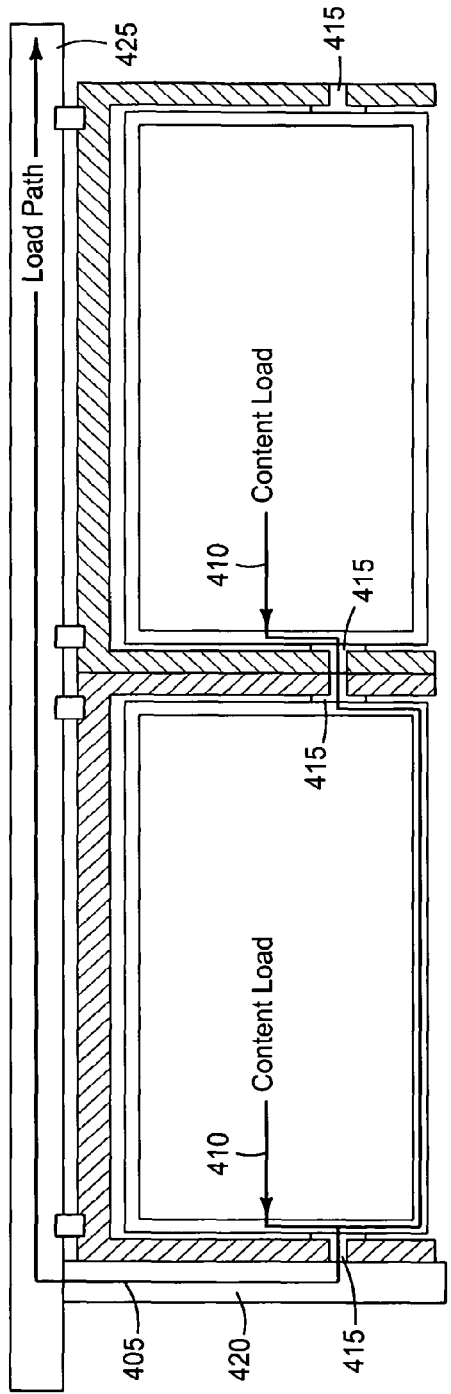
FIG. 5A is a block diagram illustrating the load path of a conventional overhead stowage bin under a forward load condition, such as a crash.

FIG. 5A is a block diagram illustrating the load path 405 of a conventional overhead stowage bin under a forward load condition, such as a crash. As illustrated, in the event of a forward load condition, the contents of the stowage bin apply a forward content load 410 within the bin. In some circumstances, the forward content load 410 can be quite significant. Therefore, current FAA regulations require that each overhead stowage bin be able to withstand an ultimate forward inertial load factor of 9 g.

One common approach for satisfying this requirement is illustrated in FIG. 5A. As shown, when the contents of the stowage bin apply a forward content load 410 against forward side wall 417 of a bucket 416, the forward side wall 417 channels the load 410 through a pivot boss 415 forward through the cabin until it reaches a large metallic or composite endframe 420 which, in turn, typically routes the load 410 to connecting panels (not shown) attached to the airframe 425, thereby creating the load path 405A illustrated in FIG. 5A. As shown in FIG. 5A, the forward content load is transmitted from a bucket to the airframe via the endframe 420.

Figure 5B:
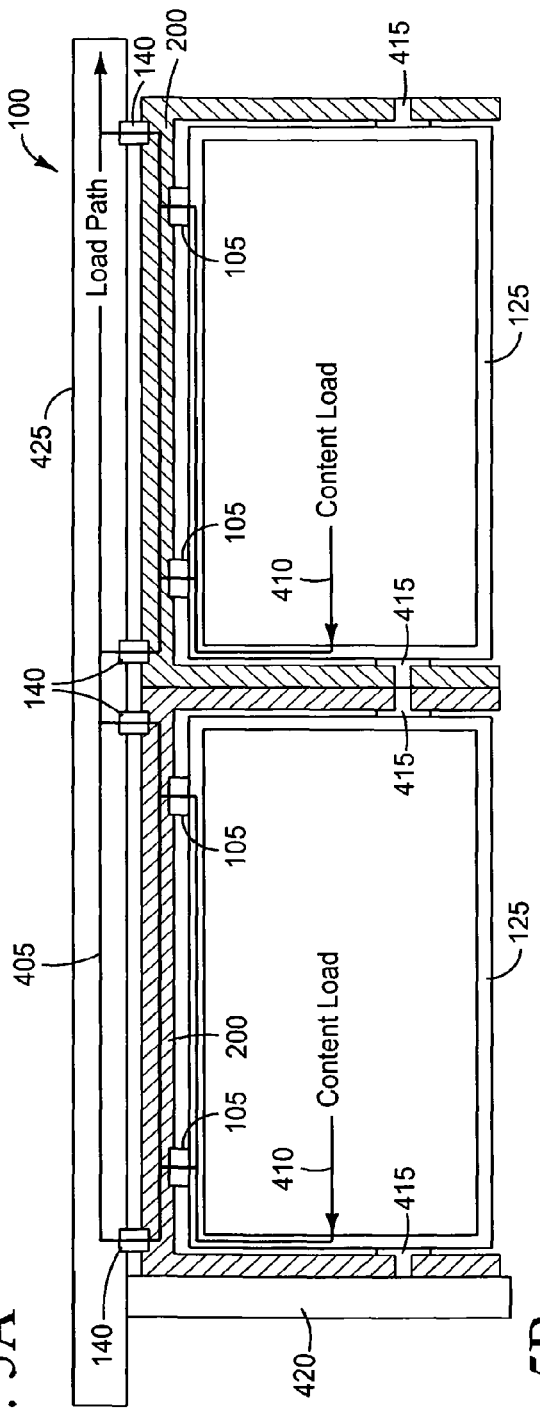
FIG. 5B is a block diagram illustrating the load path of a stowage bin assembly with shear fittings under a forward load condition, such as a crash.

FIG. 5B, by contrast, is a block diagram illustrating the load path 405B of a stowage bin assembly 100 with shear fittings 105 under a forward load condition, according to one embodiment of the present application. As shown, when the contents of a bin of the bin assemblies 100 apply a forward content load 410, a load path is provided that transmits the forward content load to the airframe 425 via the forward side wall 417 of a bucket to the lateral wall 418 of the bucket, between the forward side wall 417 and the rearward side wall 419 of the bucket, then to the shear fittings 105 which, in turn, route the load 410 directly to one or more support panels 200 (e.g., upper panel 110 or lower panel 115) attached to the airframe 425, thereby creating the load path 405B illustrated in FIG. 5B. Thus, the shear fittings 105 route the forward weight load from a bucket directly to at least one support panel mounted to the airframe under a forward load condition to create a more efficient load path 405B to the airframe 425, i.e., a more efficient means of transmitting forward weight load to the airframe, under forward load conditions, resulting in a number of advantages over conventional overhead stowage bins.

For example, as illustrated in FIG. 1, the bin assemblies 100 with shear fittings 105 can advantageously be designed without a strongback, or rear panel. In conventional overhead stowage bin design, a strongback panel is often necessary to provide sufficient structural support to satisfy the regulatory requirements for forward load conditions. By eliminating the need for a strongback panel, the shear fittings 105 can advantageously reduce the overall bulk and weight of the stowage bin assemblies 100. This can also simplify and lower the cost of the manufacturing process for the bin assemblies 100.

In addition, as shown in FIG. 5B, the shear fittings 105 create a load path 405B that bypasses the large metallic or composite endframes 420 typically required to handle forward loads in conventional overhead stowage bin design. As a result, certain endpanels can be made smaller or eliminated altogether, since they are used primarily for only vertical and lateral loads. Hence, a bin assembly with shear fittings 105 advantageously enables additional reductions in overall bulk and weight within the passenger cabin, as well as additional cost savings in materials and labor.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. An overhead stowage bin assembly for a vehicle, comprising:
    an overhead stowage bin comprising a forward side wall and a lateral wall configured to contain a load, the overhead stowage bin being rotatable about a pivot between an open position and a closed position; and
    at least one shear fitting between the lateral wall of the overhead stowage bin and a frame of the vehicle for routing a portion of the load from the overhead stowage bin to the frame of the vehicle via the lateral wall and the at least one shear fitting under a forward load condition during which a forward load is directed against the forward side wall, the at least one shear fitting configured to withstand shear forces encountered between the overhead stowage bin and the frame, the at least one shear fitting comprising a first component on the lateral wall of the overhead stowage bin, and a second component attached to a bin assembly panel to direct at least a portion of the forward load to the frame, the first component and the second component of the at least one shear fitting being disengaged when the overhead stowage bin is in the open position, and being engaged when the overhead stowage bin is in the closed position, wherein the overhead stowage bin is coupled between side panels mounted to the vehicle, the overhead stowage bin being rotatable relative to the side panels between the open position and the closed position.

2. The overhead stowage bin assembly of claim 1, wherein one of the first component and the second component comprises a male component, and the other of the first component and the second component comprises a female component.

3. The overhead stowage bin assembly of claim 2, wherein the male component comprises at least one extension configured to have a thick portion near a base of the extension and a thinner portion near a tip of the extension, and wherein the female component comprises at least one groove correspondingly configured to receive the at least one extension of the male component.

4. The overhead stowage bin assembly of claim 1, wherein the at least one shear fitting comprises a plurality of spaced shear fittings.

5. The overhead stowage bin assembly of claim 1, wherein the first component and the second component comprise a composite material.

6. The overhead stowage bin assembly of claim 1, wherein the bin assembly panel comprises one of an upper support panel and a lower support panel rigidly mounted to the frame of the vehicle.

7. The overhead stowage bin assembly of claim 1, wherein the first component is formed as an integral part of the lateral wall of the overhead stowage bin.

8. The overhead stowage bin assembly of claim 6, wherein the second component is formed as an integral part of one of the upper support panel and the lower support panel.

9. The overhead stowage bin assembly of claim 1, wherein the at least one shear fitting is configured to withstanding a forward inertial load factor of at least about 9 g.

10. The overhead stowage bin assembly of claim 1, wherein the stowage bin assembly lacks a strongback panel.

11. The overhead stowage bin assembly of claim 1, wherein the vehicle comprises an aircraft.

12. An overhead stowage bin assembly for an aircraft, comprising:
    a plurality of overhead stowage bins, at least one overhead stowage bin of the plurality of overhead stowage bins comprising a forward side wall, a rearward side wall and a lateral wall between the forward side wall and the rearward side wall configured to contain a load, the at least one overhead stowage bin of the plurality of overhead stowage bins being rotatable about a pivot between an open position and a closed position; and
    a plurality of spaced shear fittings between the lateral wall of the at least one overhead stowage bin of the plurality of overhead stowage bins and a frame of the aircraft for routing a portion of the load from the overhead stowage bin to the frame of the aircraft via the lateral wall and the plurality of spaced shear fittings under a forward load condition during which a forward load is directed against the forward side wall, the plurality of spaced shear fittings configured to withstand shear forces encountered between the overhead stowage bin and the frame of the aircraft, at least one spaced shear fitting of the plurality of shear fittings comprising a first component on the lateral wall of the overhead stowage bin, and a second component attached to a bin assembly panel to direct at least a portion of the forward load to the frame the first component and the second component of the at least one spaced shear fitting being disengaged when the overhead stowage bin is in the open position, and being engaged when the overhead stowage bin is in the closed position, wherein each overhead stowage bin of the plurality of overhead stowage bins is coupled between side panels mounted to the aircraft, each overhead stowage bin being rotatable relative to the side panels between the open position and the closed position.

13. The overhead stowage bin assembly of claim 12, wherein one of the first component and the second component comprises a male component and the other of the first component and the second component comprises a female component for receiving the male component.

14. The overhead stowage bin assembly of claim 13, wherein the male component comprises at least one extension configured to have a thick portion near a base of the extension and a thinner portion near a tip of the extension, and wherein the female component comprises at least one groove correspondingly configured to receive the at least one extension of the male component.

15. The overhead stowage bin assembly of claim 12, wherein the bin assembly panel comprises one of an upper support panel and a lower support panel rigidly mounted to the frame of the aircraft.

16. The overhead stowage bin assembly of claim 12, wherein the first component and the second component comprise a composite material.

17. A method for securing an overhead stowage bin within a vehicle, comprising:

providing an overhead stowage bin comprising a forward side wall and a lateral wall configured to contain a load, the overhead stowage bin being rotatable about a pivot between an open position and a closed position; and providing at least one shear fitting between the lateral wall of the overhead stowage bin and a frame of the vehicle, the at least one shear fitting for routing a portion of the load from the overhead stowage bin to the frame of the vehicle, the at least one shear fitting withstanding shear forces and routing a forward load to the frame of the vehicle when the forward load is directed against the forward side wall, the at least one shear fitting comprising a first component on the lateral wall of the overhead stowage bin, and a second component attached to a bin assembly panel to direct at least a portion of the forward load to the frame, the first component and the second component of the at least one shear fitting being disengaged when the overhead stowage bin is in the open position, and being engaged when the overhead stowage bin is in the closed position, wherein providing the overhead stowage bin further comprises coupling the overhead stowage bin between side panels mounted to the vehicle, the overhead stowage bin being rotatable relative to the side panels between the open position and the closed position.

18. The method of claim 17, wherein the vehicle comprises an aircraft.

\* \* \* \* \*